United States Patent [19]

Woltman

[11] 4,308,138
[45] Dec. 29, 1981

[54] TREATING MEANS FOR BODIES OF WATER

[76] Inventor: Robert B. Woltman, 44625 Tonapah St., Newberry Springs, Calif. 92365

[21] Appl. No.: 157,970

[22] Filed: Jun. 9, 1980

Related U.S. Application Data

[63] Continuation-in-part of Ser. No. 923,463, Jul. 10, 1978, Pat. No. 4,226,719, which is a continuation of Ser. No. 771,882, Feb. 25, 1977, abandoned, which is a continuation-in-part of Ser. No. 694,847, Jun. 10, 1976, abandoned.

[51] Int. Cl.³ .......................... C02B 3/08; B01F 3/04
[52] U.S. Cl. .................................. 210/220; 210/758; 261/77; 261/DIG. 75
[58] Field of Search .................. 210/198.1, 220, 221.1, 210/758; 261/76, 77, DIG. 75

[56] References Cited

U.S. PATENT DOCUMENTS

| | | | |
|---|---|---|---|
| 1,922,920 | 8/1933 | Aherne | 261/76 X |
| 1,960,914 | 5/1934 | McCoy | 261/77 |
| 2,328,414 | 8/1943 | Beyer | 261/77 X |
| 3,524,630 | 8/1970 | Marion | 261/76 |
| 3,671,022 | 6/1972 | Laird et al. | 261/DIG. 75 |
| 4,049,552 | 9/1977 | Arff | 261/DIG. 75 |
| 4,098,851 | 7/1978 | Schulte et al. | 261/DIG. 75 |
| 4,162,970 | 7/1979 | Zlokarnik | 210/220 X |

*Primary Examiner*—Robert H. Spitzer
*Attorney, Agent, or Firm*—John H. Crowe

[57] ABSTRACT

A device for aerating lakes, the main part of which is an elongate casing having a longitudinal water passage through it. Between the inlet and outlet of this passage there is a frusto-conical segment converging to a restricted outlet opening and a cylindrical barrel segment spaced downstream of, and in axial alignment with, the frusto-conical segment. Surrounding and including the axial space between the frusto-conical and cylindrical segments is a mixing chamber having a pair of air intake openings to which air hoses are attached. A straight tubular nozzle is attached to the casing at its outlet end, which nozzle has a unique beveled configuration at its discharge end and a pair of apertures through its wall. The device is positioned underwater for use with the air hoses from the mixing chamber in communication with the atmosphere. A submersible pump forces water into the casing which emerges as a jet stream from the restricted opening in its frusto-conical segment. The stream passes through the cylindrical barrel segment without contacting the walls of that segment, and on into the nozzle. Air is drawn in through the intake openings of the mixing chamber and this air mixes with surface water in the jet stream. The stream encounters back water partway through the tubular nozzle, downstream of which complete mixing of the water and air occurs. The stream with the entrained air then surges outwardly through the nozzle and into the surrounding body of water in a fanning action.

3 Claims, 5 Drawing Figures

U.S. Patent      Dec. 29, 1981      4,308,138
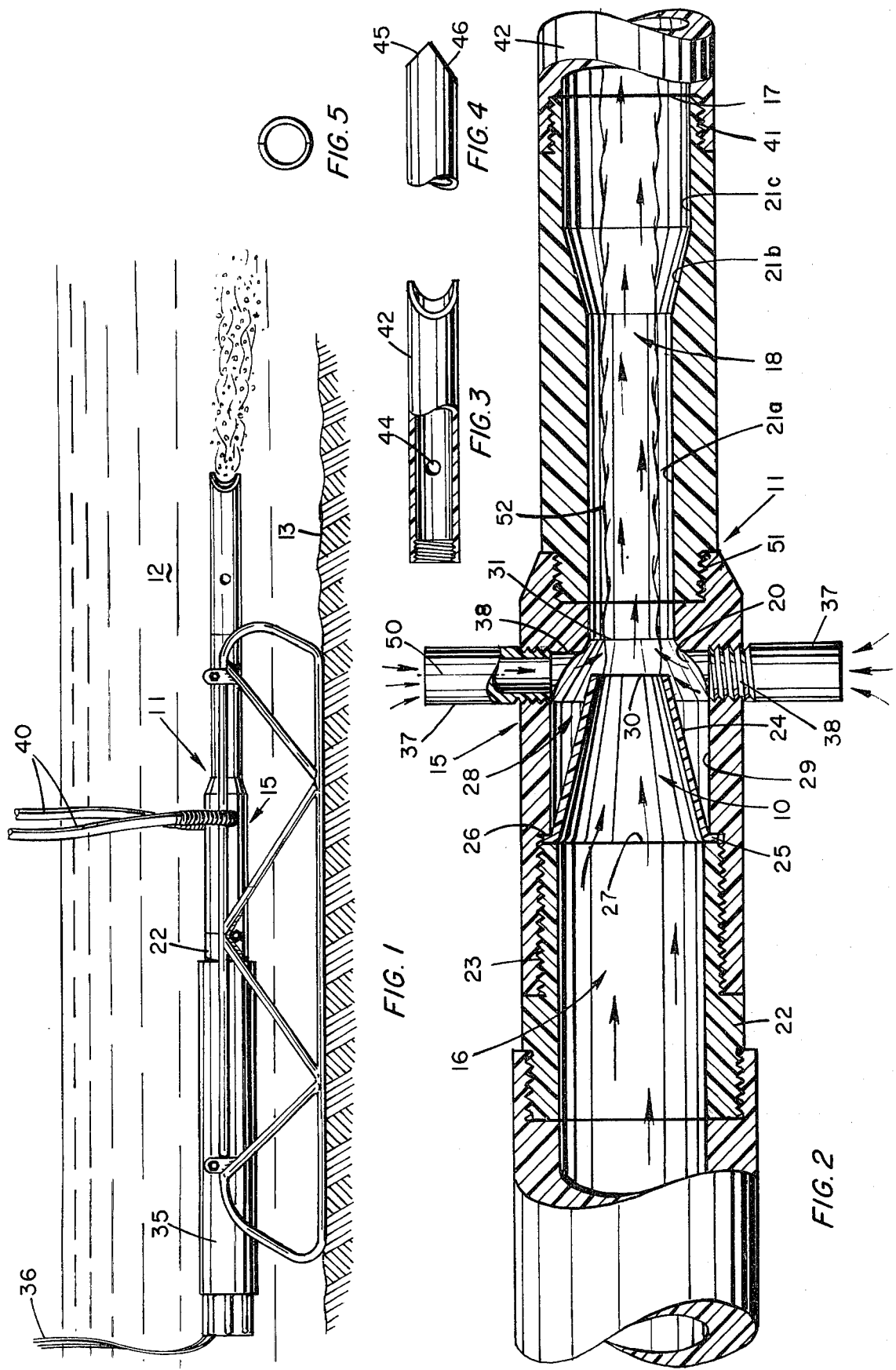

TREATING MEANS FOR BODIES OF WATER

CROSS-REFERENCE TO RELATED APPLICATIONS

This application is a continuation-in-part of my co-pending U.S. application Ser. No. 923,463, filed July 10, 1978, U.S. Pat. No. 4,226,719 which is a continuation of application Ser. No. 771,882, filed Feb. 25, 1977, now abandoned, which was, in turn, a continuation-in-part of application Ser. No. 694,847, filed June 10, 1976, now abandoned.

BACKGROUND OF THE INVENTION

This invention relates generally to a device for the purifying treatment of a body of water and more particularly to such a device adapted to simultaneously aerate and chemically treat the body of water to prevent or retard eutrophication of the water.

Ponds, lakes and other bodies of water, particularly those in which water is generally quiescent, have a tendency to become eutrophic and thereby support dense growths of algae and undesirable underwater weeds that decay and deplete the water of oxygen. Without agitation, insufficient oxygen can be absorbed from the air by the water to replace that lost through eutrophication so that the water is unable to properly support fish and other aquatic life. The presence of excessive algae and certain types of weeds in lake waters is undesirable for various reasons, including the tendency of the algae to attract insects such as midges and the interference with navigation by thick weed growths.

Heretofore, numerous attempts have been made to aerate the waters of lakes, ponds and the like, but all such attempts of which I am aware have involved the use of shore-installed compressors and many feet of air line to convey compressed air from the compressors into the bodies of water being treated. Such systems have universally failed to do the job properly, primarily due to the fact that they result in the introduction of relatively large air bubbles into the water, which bubbles quickly rise to the surface and pass into the atmosphere. Only minute amounts of oxygen in the bubbles can be absorbed by the water during the quick rise of the bubbles to the surface. Consequently, very little aeration of the water can take place, and this only in the immediate vicinity of the vertically rising bubbles, which means that what little aeration does take place is localized, not uniformly occurrent throughout the body of water, particularly where the body is relatively large as in the case of a big lake. Methods heretofore employed for the chemical treatment of bodies of water have generally involved the manual dumping of a treating chemical (typically copper sulfate) from a boat by a crew. Where a two man crew is employed for this purpose, the treatment of a good-sized lake can take several days, and sometimes even weeks.

As those skilled in the art will appreciate, the conventional methods and apparatus heretofore employed for the aeration and chemical treatment of large bodies of water have been time consuming and expensive, and, furthermore, have been largely ineffective in accomplishing the intended purpose with the desired degree of success.

SUMMARY OF THE INVENTION

I have now, by this invention, provided a simple water treating device for submersion in a lake or other body of water that can effectively aerate and simultaneously disperse a chemical treating agent throughout the body of water, and which can be operated by a single man at a central location to accomplish all of this. The device, in its preferred form, comprises an elongate casing fitted with a nipple having a water passage running from end to end therethrough. From its inlet end, the passage extends through the nipple, then converges downstream, in a frusto-conical segment, to a restricted outlet. Spaced downstream from the outlet of the frusto-conical segment is a barrel segment, the first part of which is preferably cylindrical and in axial alignment with the frusto-conical segment. This cylindrical portion of the barrel segment is of larger diameter than the restricted outlet opening of the frusto-conical segment. Beyond its cylindrical portion, the passageway through the barrel segment preferably expands concentrically to a diameter less than that of the aforesaid nipple, and thereafter extends cylindrically to the outlet of said casing. Surrounding and including the axial space between the frusto-conical segment and barrel segment, is a mixing chamber with built-in means for admitting air into the chamber. Preferably the air intake means comprises a pair of oppositely positioned openings through the chamber walls provided with fittings adapted to receive a pair of air lines.

The frusto-conical segment of the water treating device is formed by a thin-walled, funnel-like member properly positioned within said casing. The mixing chamber substantially surrounds this member, and the positional relationship between the restricted outlet opening of the frusto-conical segment and the air intake openings in said chamber are such that the axes of these openings coincide with the plane of said restricted outlet opening.

Removably attachable to the casing, at its outlet end, is a cylindrical nozzle with a unique beveled configuration at its discharge end and, preferably, a pair of openings through its wall partway between its ends.

The device can be placed at the bottom of a body of water to be aerated, preferably connected at its inlet end to a submersible pump, with air lines stretching from the intake openings in its mixing chamber to the surface above the water. When the submersible pump is turned on, it forces water into the casing, which emerges from the outlet opening of its frusto-conical segment as a jet stream that creates a suction in the mixing chamber to first purge it of any water present and then draw air from the atmosphere through the intake openings into the chamber. The axial alignment of the frusto-conical segment and first cylindrical portion of the barrel segment insures unobstructed passage of the jet stream into the barrel segment. Since the diameter of said cylindrical portion is larger than that of the restricted outlet opening of the frusto-conical segment, the jet passes through said cylindrical portion out of contact with its wall. The air drawn into the mixing chamber is forced into the jet stream by the atmospheric pressure of the air at the water surface. This results in a decrease in density of the water in the stream and an increase in velocity due to the entrained air. Partial mixing is believed to occur in the mixing chamber resulting in a zone of mixed air and water around a solid core of water in the jet stream.

When the device with the aforesaid nozzle attached, is in operation, the jet stream, with its core of water and surrounding zone of air/water mix passes through the barrel segment of the casing and into the nozzle, where it ultimately encounters back water from the body of water in which it is submerged. At this point, a change in the energy state occurs which I classify as a "hydraulic jump." Downstream of this point, complete mixing occurs which continues into said body of water. The above-mentioned openings in the nozzle wall are positioned upstream of the "hydraulic jump", and the velocity of the jet at this point causes additional water to enter the system producing a great increase in mixing efficiency.

The tapered discharge end of the nozzle, which will be described in greater detail hereinafter, results in a fanning action of the outpouring stream which is especially effective in providing mixing and oxygen transfer.

The device of this invention results in the creation of extremely low pressures in the mixing chamber ($-27''$ of mercury gauge), as a result of which the system is capable of ingesting, mixing and dispersing treatment chemicals in either granular or liquid form into the body of water to be treated without interrupting the aeration process. To accomplish this, one of the air lines is inserted into a bag or vessel containing the treatment chemical, where atmospheric air pressure forces the chemical into the system causing mixing in the same manner as air is mixed.

It is thus a principal object of the present invention to provide means for the aeration, or simultaneous aeration and chemical treatment, of a large body of water by a single man at a single work station, at minimal cost of labor and equipment.

It is another object of the invention to provide such means that draws its feed air directly from the atmosphere and thereby requires no shore mounted compressor and/or blowers for a supply of such air.

It is still another object of the invention to provide such means of simple construction and manner of operation capable of uniformly distributing oxygen and chemical treating agents throughout large bodies of water in effective proportions to meet recommended environmental standards.

Yet another object of the invention is to provide such means serving additionally to create sufficient circulation and upwelling of the water of lakes and ponds to prevent harmful temperature stratification therein.

Still another object of the invention is to provide such means of extremely simple construction having no moving parts and relatively maintenance free, and relatively inexpensive to manufacture.

Other objects, features and advantages of the invention will become apparent in the light of subsequent disclosures herein.

BRIEF DESCRIPTION OF THE DRAWING

FIG. 1 is a side elevation of a preferred form of water treating device in accordance with this invention with a cooperating nozzle attached, the device being shown in operation immersed in a body of water.

FIG. 2 is an enlarged longitudinal view, mostly in section, of the device and attached nozzle, the nozzle being shown partially broken away.

FIG. 3 is a side view, partly in section and drawn to a reduced scale, of the discharge nozzle shown fragmentarily in FIG. 2.

FIG. 4 is a fragmentary top view of said discharge nozzle.

FIG. 5 is an end view of the discharge nozzle as seen from the right of its FIG. 3 position.

DESCRIPTION OF THE PREFERRED EMBODIMENT

Considering now the drawing in greater detail, the water treating device is therein indicated generally at 11. In FIG. 1, the device is shown in operation submerged in a body of water 12 having a bottom 13.

The device 11 comprises an elongate casing 15 having a water passage extending longitudinally therethrough. This passage includes an inlet 16 of round cross-section, an outlet 17 of round cross-section and smaller inside diameter than inlet 16, a frusto-conical segment 10 intermediate the inlet and outlet, and a barrel segment 18 axially spaced from the frusto-conical segment, downstream of the latter. The barrel segment 18 includes a first cylindrical chamber 21a, a second cylindrical chamber 21c terminating in the outlet 17, and a frusto-conical chamber 21b interconnecting the first and second chambers. The presence of the frusto-conical chamber is merely a design expedient, and not a critical hydraulic requirement of the system.

A nipple 22 is threaded at 23 into the casing 15 to form the aforesaid inlet 16. The frusto-conical segment 10 of the water passage through the casing is formed by a relatively thin-walled frusto-conical member 24 having an out-turned annular flange 25 around its larger end by means of which it is clamped in place between an annular shoulder 26 within casing 15 and the right end 27 of the nipple 22, to hold it in axial alignment with the barrel segment 18, in the manner illustrated in FIG. 2. The frusto-conical member 24 extends into a mixing chamber 28 having a first section 29 of cylindrical shape and a second section 20 of generally frusto-conical shape, and is concentrically spaced from the walls of said mixing chamber, again in the manner illustrated in FIG. 2. The frusto-conical member 24 converges toward a restricted outlet opening 30 located within the frusto-conical section 20 of the mixing chamber.

Spaced axially downstream of the restricted outlet opening 30 of frusto-conical segment 10 of the water passage in casing 15 is an inlet opening 31 into the barrel segment 18 of casing 15. This opening 31 is round, of the same diameter as the first cylindrical section 21a of the barrel segment, and, as previously indicated, concentrically centered with respect to the opening 30. Moreover, and this is a critically important feature of my invention, the opening 31 into the barrel segment is of larger diameter than the outlet opening 30 of frusto-conical segment 10, for reasons which will be explained hereinafter.

The casing 15 is preferably supported near the bottom of a lake or pond to be aerated or aerated and chemically treated in the manner illustrated in FIG. 1, where it is shown attached to a submersible pump 35 by means of the nipple 22. The submersible pump is an electrically powered pump of known type and commercial availability, the power being supplied through a cable 36 extending to a suitable power source, not shown. Alternatively, the treating device could be installed for use with a shore-mounted water pump through a suitable hose connection, if desired. The submersible pump arrangement is much preferred, however, since this makes it possible to submerge the whole assembly (treating device and pump) in very shallow water (as shallow, for example, as 18 inches) for use, if need be, and cuts down greatly on equipment installation, operation and maintenance costs.

A pair of intake conduit stubs 37 are threaded into a pair of receptive, partially tapped bores 38 through the walls of casing 15, which bores extend radially into the mixing chamber 28 through the wall of the frusto-conical section 20 of that chamber. A pair of flexible suction lines 40 are respectively attached at their lower ends to the conduit stubs 37 and suitably supported, by means not shown, with their upper ends above the surface of the body of water 12. The two conduit stubs 37 are positioned in axial alignment on opposite sides of casing 15 and the outlet opening 30 of the frusto-conical member 24 is disposed at a point along the axis of casing 15 coincident with the extended axes 50 of these two stubs, as illustrated in FIG. 2. I have experimentally determined that this position of the opening 30 of frusto-conical member 24 midway of the distance across the conduit stub openings is an important feature of my invention. Likewise, I have reason to believe that the use of two oppositely positioned conduit stubs is an important feature of the invention, and one which contributes to the previously mentioned fanning action of the outlet stream from my novel device, as will be discussed in greater detail below.

The outer end of casing 15 is screw threaded at 41 to the inner end of a straight tubular nozzle 42, preferably formed (as is casing 15, incidentally) of a suitable plastic material. The nozzle 42 is of the same inner diameter as the second cylindrical portion 21c of barrel segment 18 of the treating device, and has a pair of diametrically opposite openings 44 (see FIG. 3) formed in its wall. For best results, these openings should be spaced at a distance equal to approximately one-third the length of the nozzle from the outlet 17 of the casing 15. Such openings should also, for best results, have diameters approximately one-third the inside diameter of the nozzle. It is not necessary that nozzle 42 be threaded directly onto casing 15, and it can be attached thereto by means of a coupling, or in any other suitable manner, as desired.

At its outlet end, as seen to the right in FIG. 3, the nozzle 42 is beveled from the sides to a pointed configuration at its center (see FIG. 4). The beveled angles are intentionally different, one being more acute than the other, as can be seen in FIG. 4 at 45 and 46, respectively. It makes no difference on which side of the nozzle the more acute angle occurs. This angled end configuration of the nozzle 42 is a very important feature of my invention since, as previously indicated, I have discovered that it results in an oscillating, side-to-side sweeping or fanning motion of the exit stream from the nozzle during operation of the treating device. This sweeping or fanning motion greatly enhances the ability of the treating device to disperse and distribute entrained air or entrained air and dissolved treating chemicals throughout the body of the water being serviced by the device. While the nozzle will be somewhat effective for use where it has a blunt, rather than a beveled, discharge end, its effectiveness is greatly enhanced where it has the beveled end configuration.

Operation of the water treating installation of this invention is easily effected by one person in a central location. To place the system in operation, it is only necessary to switch on the power to the submersible pump 35, which then forces water from the body of water 12 into the inlet 16 of treating device 11. Because of the converging walls of the frusto-conical segment 10 in the water passage through the casing 15 the water passes through the restricted opening 30 of the frusto-conical member 24 as a relatively high velocity jet stream, such as illustrated at 52 on FIG. 2. This jet stream travels through the mixing chamber 28 without dispersing and enters the first cylindrical chamber 21a of the barrel segment of the casing through its inlet opening 31. An extremely low pressure is thus induced in the mixing chamber ($-25$ to $-27$ inches of mercury gauge). The air pressure at the surface of the body of water forces air through the flexible lines 40 and intake stubs 37, then into jet stream 52 in the mixing chamber. Although the amount of air is variable, depending to a small degree on depth, the result, as previously noted, is a decrease in the density of the water and an increase in velocity due to the entrained air. An increase in available energy has occurred resulting from the "push" provided by nearly one atmosphere of pressure acting on the surface of the jet stream.

I have discovered that even though the mixing chamber is initially full of water in heads as great as 135 feet of water (5 atmospheres of pressure), the device is able to purge the chamber and the air induction lines. There is no other device, to my knowledge, that can do this without auxiliary air pressure input from a compressor at an additional power cost. There appears to be no change in the back pressure on the pump during the purging process as the mixing chamber fills with air.

While I cannot say with certainty what actually occurs during operation of my treating device, much study and experimentation has led me to conclude that partial mixing of air and water occurs in the mixing chamber 28 as the jet of water passes therethrough, resulting in a zone of mixed air and water around a solid core of water in the jet. There is evidence to indicate that no contact occurs between the jet and the rim of inlet opening 31 into the first cylindrical chamber 21a of the barrel segment of casing 15, or with the cylindrical wall of that chamber. It is critical that this cylindrical chamber be in axial alignment with the outlet opening 30 of frusto-conical member 24 so that the jet of water is centered therewithin to avoid impinging contact between the jet and the wall of the chamber. I wish to again emphasize that the frusto-conical chamber 21b of the barrel segment 18 is merely for convenience, and not a hydraulic requirement of the system. Consequently, the present unit differs radically from a venturi which, as those skilled in the art are aware, requires a smooth exit taper.

The water jet with its core of water surrounded by a zone of air/water mix passes through the barrel segment of casing 15 and into the straight nozzle 42, where it ultimately encounters back water from the body of water in which the treating device is immersed. At this point, the location of which is determined by the relationship between the discharge velocity and depth of water in which the system is operating, the change in energy state referred to previously as a "hydraulic jump" occurs. Downstream of this point, complete mixing occurs which continues into the surrounding body of water. The two openings 44 in the wall of discharge nozzle 42 are positioned short of the "hydraulic jump" in nozzle 42 to permit additional water to enter the system, and this results in a great increase in mixing efficiency.

As the stream passes out through the beveled end of the nozzle 42, it penetrates deep into the body of water 12 in the laterally sweeping motion previously referred to. This sweeping or fanning action of the stream is especially effective in shallow water, and greatly improves mixing and oxygen transfer. A water treating set-up such as illustrated and described herein has been demonstrated in a closed system to transfer 6.25+ pounds of dissolved oxygen per horsepower hour of applied power. As an example of the remarkable effectiveness of this system, I have tested it using a four-inch submersible pump in horizontal configuration and a three-inch discharge nozzle and demonstrated that it produces nearly uniform oxygen and temperature distribution in a reservoir 136 feet deep and two miles in length containing more than 42 billion gallons of water, without increasing nitrogen levels near the bottom.

Because of the extremely low pressure induced in mixing chamber 28, my system is capable of ingesting, mixing and dispersing treatment chemicals in either granular or liquid form into a body of water without interrupting the aeration process. In tests run in the above-mentioned reservoir, the system was found to distribute 700 pounds of copper sulfate uniformly throughout the body of water without any danger to fish or benthic organisms. Such chemical dispersion is accomplished by inserting one of air lines 40 into a bag or vessel containing the treatment chemical (the other air line being closed or throttled) so that air pressure forces the chemical into the system causing mixing in the same manner as air is mixed with no additional use of energy. I am aware of no other system which can accomplish this. The above-described copper sulfate distribution in the 42-billion-gallon reservoir succeeded in reducing weed growth therein to such an extent that waterways previously unnavigable by small boats were thereafter clear for navigation. My system has been shown to maintain an oxygen level of 5-6 parts per million in the lower levels of the aforesaid reservoir, as contrasted with a level of 1 part per million that was the best a previously employed compressed air system was able to maintain.

The illustrated embodiment of my invention includes an important feature that deserves special mention here, this being the fact that the frusto-conical member forming the frusto-conical segment of the passage through the casing of the treating device is removable and can be interchanged to provide a range of water jet velocities to meet different conditions of input pressure/-velocity relationship and back pressure due to depth. Thus, the unit has versatility for use at a variety of water depths through the simple substitution of frusto-conical members with different outlet opening sizes for one another.

Although it has not been mentioned herein, the illustrated casing for my novel treating device can be readily disassembled for shipment, repair, etc. because it is made in parts that are threadedly connectable at 51 for ease of assembly and disassembly.

While my novel water treating means has been herein described and illustrated in what I consider to be a preferred embodiment, it will be appreciated by those skilled in the art that my invention is not limited to that particular embodiment but is broad enough in concept to encompass all modifications thereof incorporative of the structural and functional essence of the invention as taught herein. For example, the mixing chamber of my device can have one air intake opening (or more than two openings), rather than the two shown in the drawing, if desired. Two such openings are much to be preferred, however, particularly for use of the device in the distribution of chemicals in bodies of water. This is true because with two air lines available, complete control of chemical dispersion rates can be achieved without interruption of the aeration cycle, a result that cannot be achieved where there is only one air line. In summary, it is emphasized that the present invention includes within its scope all variant forms thereof encompassed by the language of the following claims.

I claim:

1. Treating means particularly adapted for dispersing a treating agent in a body of water comprising:

casing means for immersion in said body, said casing means having a passage therethrough including, an inlet for connection to a source of pressurized water, an outlet of lesser cross-sectional area than said inlet, a frusto-conical segment converging in the downstream direction to a restricted outlet opening disposed intermediate the inlet and outlet, and a barrel segment defining an elongate passageway of round cross-section, which barrel segment is in axially spaced relationship with, and downstream of, said restricted outlet opening, said barrel segment being in axial alignment with said frusto-conical segment and having a round inlet opening into said elongate passageway concentrically disposed with respect to said restricted outlet opening and of larger cross-section than the latter;

said casing means having structural means forming an enclosed mixing chamber of round cross-section including and surrounding the axial space between the restricted outlet opening of said frusto-conical segment and the inlet opening of said barrel segment, which mixing chamber has intake opening means adapted for communication with the atmosphere above said body of water, said intake opening means defining at least one passage extending radially into said mixing chamber and the restricted outlet opening of said frusto-conical segment being positioned at a plane perpendicular with the axis of said casing means and substantially coincident with the extended axis of the at least one intake opening means passage;

whereby the forcing of pressurized water into the inlet of said casing means when the latter is immersed in said body of water for use forces a jet stream of the water through the restricted outlet opening of said frusto-conical segment and into the inlet opening of the barrel segment substantially out of contact with any part of said barrel segment; and whereby when said water under pressure is being forced through said casing means, air from the atmosphere is sucked into said mixing chamber through said intake opening means, when the latter is in communication with said atmosphere, which air is forced into the surface of the jet stream, by the pressure of said atmosphere, to increase the velocity of said jet stream; and whereby the jet stream continues on to eventually encounter water from said body of water, after which substantially complete mixing of the air and water in said jet stream occurs and the stream with the entrained air travels into said body of water to achieve widespread aeration thereof, said treating means including straight tubular nozzle means connectible to the outlet end of said casing means, said nozzle means having an inside diameter substantially equal to the diameter of the outlet of the casing means passage and being so characterized that the jet stream with entrained air passing through said barrel segment when said treating means is in operation encounters back water from said body of water therein and undergoes a change in energy state to bring about more complete mixing of the air and water, said nozzle means having opening means through its wall upstream of where the jet stream encounters said back water so that additional water from said body of water is drawn into the system to produce an increase in mixing efficiency.

2. Treating means in accordance with claim 1 in which said opening means in the wall of said nozzle comprises a pair of diametrically opposite apertures in said wall situated at a distance from the outlet of the passage through said casing means equal to about one-third the length of said nozzle.

3. Treating means in accordance with claim 2 in which the discharge end of said nozzle is beveled from opposite sides to the middle to form a pair of points substantially equidistant from the opposite end of the nozzle, the plane of the beveled configuration on one side being of a more acute angle relative to a plane through the axis of the nozzle and said pair of points than the plane of the beveled configuration on the other side, whereby a sweeping motion is imparted to the outlet stream from the connected nozzle when said treating means is in operation.

* * * * *